United States Patent [19]

Firestone et al.

[11] Patent Number: 5,387,040
[45] Date of Patent: Feb. 7, 1995

[54] SEALING SYSTEM

[75] Inventors: Charles R. Firestone, Greer, S.C.; Donald E. Broadus, North Vernon, Ind.

[73] Assignee: Reliance Electric Industrial Company, Del.

[21] Appl. No.: 54,955

[22] Filed: Apr. 30, 1993

[51] Int. Cl.⁶ ............................ F16C 33/76
[52] U.S. Cl. ........................ 384/477; 277/58; 277/152; 384/484
[58] Field of Search ............ 384/462, 477, 480–488; 277/152, 153, 58, 60, 178; 74/425, 89.14, 467

[56] References Cited

U.S. PATENT DOCUMENTS

| | | | |
|---|---|---|---|
| 1,769,934 | 7/1930 | Ball | 384/483 |
| 1,986,621 | 1/1935 | Bott | 384/484 X |
| 2,405,122 | 8/1946 | Firth | 384/477 |
| 2,734,393 | 2/1956 | Luenberger | 74/425 |
| 2,830,832 | 4/1958 | Moorman et al. | 384/484 X |
| 2,866,670 | 12/1958 | Harris et al. | 384/484 |
| 3,014,768 | 12/1961 | Dickinson | 384/484 |
| 3,770,993 | 11/1973 | Schultenkamper | 384/484 |
| 4,015,883 | 4/1977 | Taylor | 384/484 |
| 4,026,163 | 5/1977 | Merkert | 74/425 |
| 4,482,194 | 11/1984 | Chambers, Sr. | 384/480 |
| 4,502,739 | 3/1985 | Flander | 384/481 |
| 4,799,808 | 1/1989 | Otto | 384/481 |
| 5,040,428 | 8/1991 | Miyaoka et al. | 74/467 X |
| 5,053,661 | 10/1991 | Kitamura et al. | 74/467 X |

Primary Examiner—Thomas R. Hannon
Attorney, Agent, or Firm—Dority & Manning

[57] ABSTRACT

Sealing system for a housing containing gears operated in a lubricated environment, the housing having an opening through which a shaft supported in a bearing assembly extends for mating with at least one of the gears in the housing. Sealing system includes a seal arranged in the opening through which the shaft extends, the seal being located between the bearing assembly and the interior of the housing whereby the seal will be exposed to lubricant from the interior of the housing, but such lubricant will be prevented from leaking from the housing at the shaft input opening. Sealing system may also include a grease filled chamber between the seal and the bearing, and a packing gland located adjacent the bearing on the side of the bearing opposite the seal.

15 Claims, 2 Drawing Sheets

SEALING SYSTEM

BACKGROUND OF THE INVENTION

The present invention relates generally to sealing systems to prevent lubricant from escaping from a lubricated system and, more particularly, to a novel sealing system for a housing containing gears or the like operating in a lubricated environment.

Many sealing arrangements exist for sealing the interface between an input or output shaft and a housing with internal components such as gears or the like operating in a lubricated environment. Examples of these type systems are motor and gear reducer arrangements, gear motors, transmissions, pumps and the like. Throughout this specification and claims, gear reducer may be referred to for convenience, but it should generally be understood that such is utilized to encompass the above type systems as well as other equivalent systems.

It is desirable to prevent lubricant from the above type systems from escaping the interior of the housing and thereby contaminating the surrounding areas or producing an unsightly working environment at the interface between an input or output shaft and a sealed lubricated system such as a gear reducer. While numerous sealing systems exist, in the past, such seals have been placed on the side of the bearing assembly that is away from the interior of the housing of the gear reducer or the like and utilized primarily for the purpose of preventing debris and the like from interfering with the operation of the bearings. In such a situation, the seal may be located on the motor side of a support bearing that supports an input shaft for driving a gear reducer. In such an environment, under normal operating conditions, the seal operates in a dry condition, that is, without exposure to the lubricant. Seals operating under such conditions are subject over time to deterioration, thus requiring replacement. In addition, such seals may not effectively prevent lubricant from escaping from the system and thereby leaking in an unsightly and unsatisfactory manner.

SUMMARY OF THE INVENTION

The present invention recognizes and addresses the foregoing disadvantages, and others. Accordingly, it is an object of the present invention to provide an improved sealing system for preventing lubricant from escaping in a sealed environment.

It is another object of the present invention to provide an improved sealing system for a housing containing gears operating in a lubricated environment.

It is another object of the present invention to provide a multi-zone sealing system for enhanced sealing effectiveness.

It is a further object of the present invention to provide a sealing system with increased wearability.

It is a further object of the present invention to provide an improved sealing system that allows the primary seal to operate exposed to lubricant.

It is a further object of the present invention to provide an improved means of assembling a gear reducer without damaging the shaft seal.

These and other objects are achieved by providing an improved sealing system for sealing an input or output shaft in a gear reducer housing with a shaft input opening. The shaft is supported in the reducer housing on at least one bearing assembly in the opening at the input side. The sealing system comprises a seal arranged in the shaft input opening for surrounding the input shaft, the seal being located between the at least one bearing assembly and the interior of the gear reducer housing whereby the seal will be exposed to lubricant from the interior of the gear reducer housing but such lubricant will be prevented from leaking from the housing at the shaft input opening. The sealing system may also include a grease filled chamber between the seal and the at least one bearing and a packing gland adjacent the bearing on the side of the bearing opposite the seal. In a preferred embodiment the seal may be a radial lip seal, and may also have a teflon contact lip for contacting the shaft.

These and other objects are also achieved by providing an improved sealing system for a housing containing gears operated in a lubricated environment, the housing having an opening through which a shaft supported in a bearing assembly extends for mating with at least one of the gears in the housing. The sealing system includes a seal arranged in the opening through which the shaft extends, the seal being located between the bearing assembly and the interior of the housing whereby the seal will be exposed to lubricant from the interior of the housing but such lubricant will be prevented from leaking from the housing at the shaft input opening. The improved sealing system may also include a grease filled chamber between the seal and the bearing, and a packing gland located adjacent the bearing on the side of the bearing opposite the seal.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification including reference to the accompanying figures in which.

Figure 1:
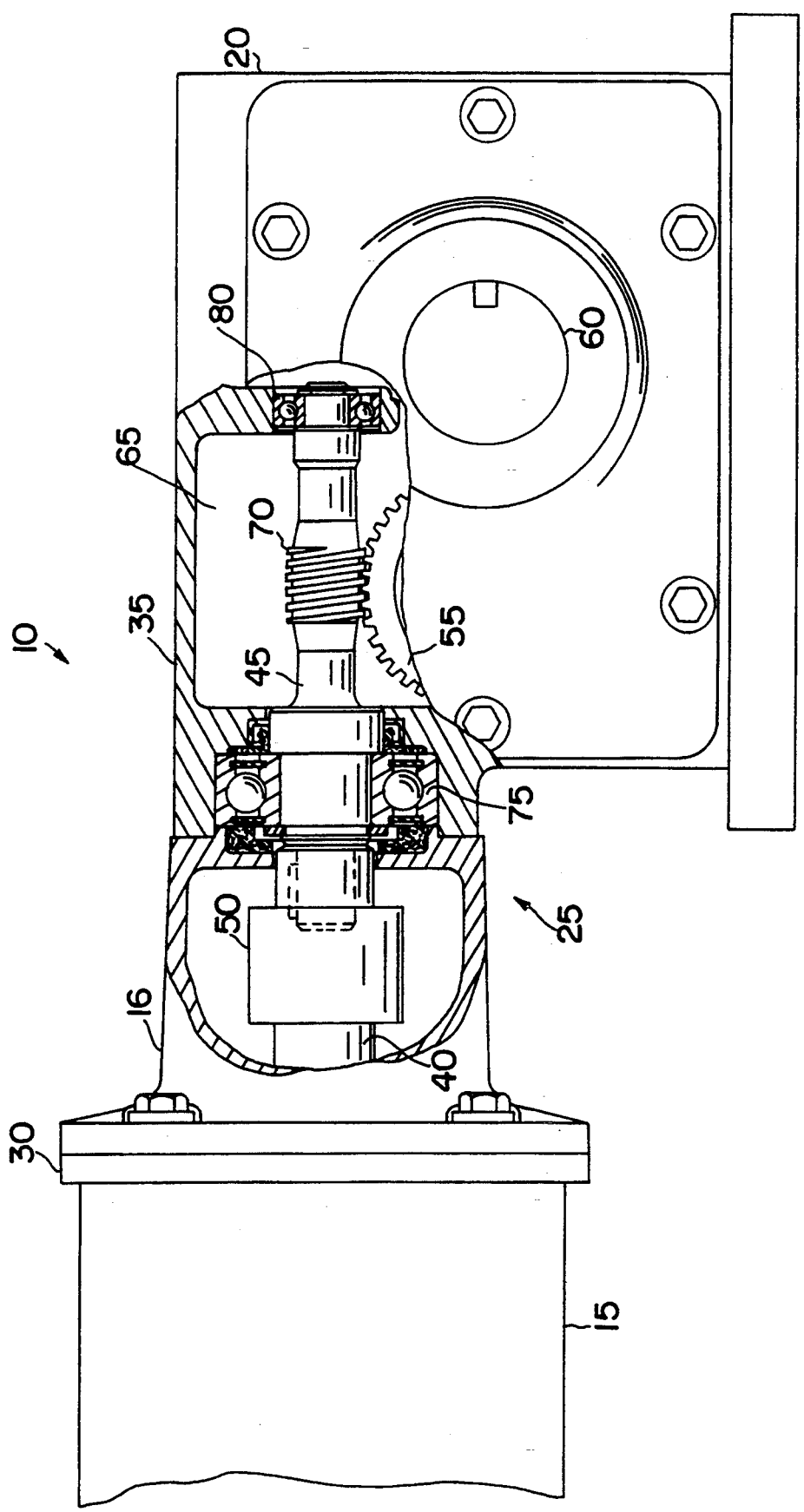
FIG. 1 is a side view with parts broken away of a motor/gear reducer combination in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by those of ordinary skill in the art that the present discussion is a description of exemplary embodiments only, and is not intended as limiting the broader aspects of the present invention, which broader aspects are embodied in the exemplary constructions.

Referring to FIG. 1, an improved sealing system for a housing containing gears or the like operating in a lubricated environment is generally illustrated at 10. While throughout this description, reference will be made to the gear reducer and motor, it should be appreciated that this is for convenience purposes only and the improved sealing system has applicability to other arrangements that necessitate sealing about an input or output shaft. Therefore, reference to motor and gear reducer should be construed broadly as set forth above.

A motor 15 is illustrated coupled to a gear reducer 20 through an interface area 25. Motor 15 includes a housing 30 and reducer 20 includes a housing 35. Motor 15 is attached to gear reducer 20 through adapter 16. Motor 15 also includes an output shaft 40 that is coupled to a pinion shaft 45 through a coupling 50. Reducer 20 includes internal gears 55 that connect input pinion shaft 45 to output shaft 60. Housing 35 defines an internal area 65 that houses gears 55 as well as the other internal gears and that operates in a lubricated environment. As used herein, lubricated environment refers to an environment where lubricant is present and does not require that the internal area 65 be completely full of lubricant.

As illustrated in FIG. 1, pinion 45 includes worm gear threads 70 that engage gear 55 for transmitting power from the motor through the gear reducer. Pinion shaft 45 is supported in gear reducer housing 35 on first bearing assembly 75 and second bearing assembly 80. While not necessary to the present invention as embodied herein, bearing assembly 75 is a double sealed bearing.

Figure 2:
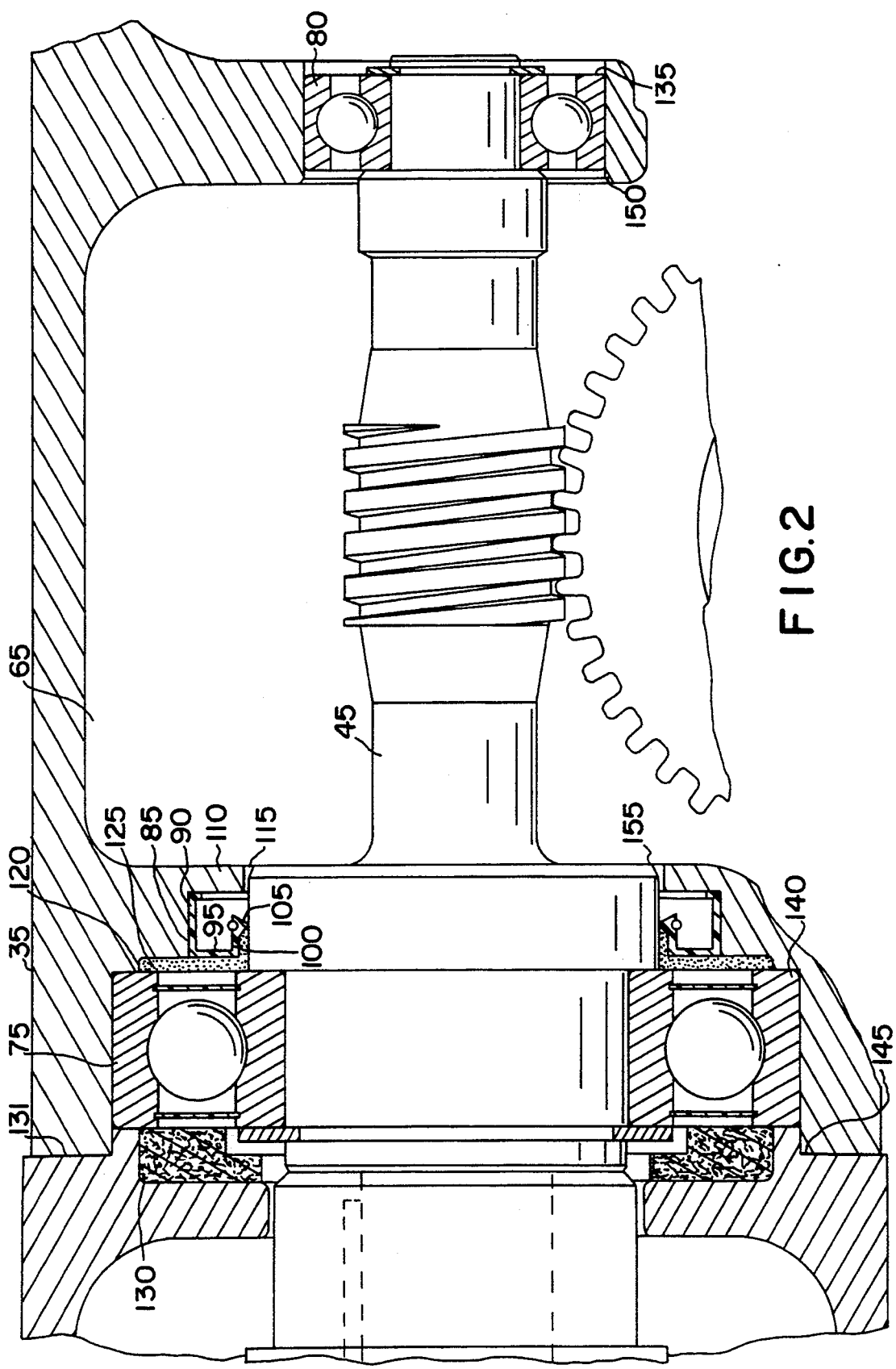
FIG. 2 is a detailed cross-sectional view of the embodiment of the present invention illustrated in FIG. 1.

With reference to FIG. 2, the sealing system in accordance with an embodiment of the present invention will be described in more detail. The improved sealing system includes a seal 85 located in reducer housing 35 so as to be between the internal area of the housing 65 and the first bearing assembly 75. As illustrated in FIG. 2, seal 85 is a radial lip seal with a first portion 90 extending substantially parallel to the axis of pinion shaft 45, a second portion 95 extending substantially perpendicular to the axis of pinion shaft 45, a third portion 100 extending substantially parallel to the axis of pinion shaft 45 and a lip portion 105 for contacting pinion shaft 45. In a preferred embodiment, portions 90 and 95 are comprised of steel or rubber coated steel. Portions 100 and 105 can be any one of many elastomeric sealing materials. Further, portions 100 and 105 may be comprised of Teflon or like material or contain such as a coating. In a further preferred embodiment, seal portion 100 may have a variable wall thickness to enhance tracking of lip portion 105 on rotating pinion shaft 45. While a radial lip seal is illustrated in FIG. 2, it should be appreciated that various other type seals may be utilized with the same purpose and effect and, as one skilled in the art will appreciate, fall within the scope of the present invention.

Housing 35 includes a flange portion 110 extending radially inward with respect to the location of seal first portion 90 and dimensioned so as to define a space 115 between pinion shaft 45 and flange portion 110. Flange 110 prevents direct splash of lubricant from the interior of housing internal area 65 from contacting seal 85, while space 115 allows lubricant mist to constantly lubricate seal 85 during operation so that it does not operate in a dry environment.

Between seal 85 and first bearing assembly 75 is chamber 120 that is filled with grease or the like 125 to further prevent leakage of lubricant through the sealing system. In a preferred embodiment, a bead of silicone rubber 131 may also be placed between the interface of housing 35 and adapter 16 to prevent leakage.

A packing gland 130 is located surrounding shaft 45 on the side of bearing 75 opposite seal 85. Packing gland 130 is preferably made of felt or other like absorbent material so that any lubricant that seeps through to that point will be absorbed by the packing gland to further prevent leakage and extend useful life of the system.

As can be seen clearly from FIG. 1, motor housing 30 and gear reducer housing 35 mate together in such a manner that the sealing system effectively prevents lubricant from escaping from gear reducer housing internal area 65 to the outside environment.

To assist in alignment of pinion shaft 45 in the gear reducer without damage to seal 85, the gear reducer housing and bearing arrangements may be dimensioned so that leading edge 135 of bearing assembly 80 and leading edge 140 of bearing assembly 75 contact portions 145 and 150 of reducer housing 35 prior to portion 155 of pinion 45 contacting seal portion 105. With this arrangement, the bearings and therefore shaft are aligned and oriented prior to contact with seal 85 when said pinion 45 is being placed into reducer housing 35 to thereby prevent damage by any misalignment to seal 85. Thereafter the pinion and the bearings can be further placed within the housing without concern as to their alignment.

As clear from the above description, including the drawings, the life of seal 85 will not be reduced by environmental contaminants since it is located inside of bearing 75 and protected thereby, and further protected by the packing material 130. Further, the overall sealing system of the present invention may allow the overall length of the shaft being sealed to be reduced. In addition, as embodied herein, disassembly of pinion shaft 45 is aided by the worm gear since the worm will act as a thread to back the worm out of the gear box. Also, the amount of heat absorbed from the motor by seal 85 will also be reduced because of its location.

These and other modifications and variations of the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An improved sealing system for sealing an input shaft in a housing of a mechanical device with a shaft input opening, said shaft being supported in said housing on at least one bearing assembly in said opening at said input side, said sealing system comprising:

a seal arranged in said shaft input opening for surrounding said input shaft, said seal being located between said at least one bearing assembly and the interior of said housing whereby said seal will be exposed to lubricant from the interior of said housing but such lubricant will be prevented from leaking from said housing at said shaft input opening;

a grease filled chamber between said seal and said bearing, said grease filled chamber further preventing leakage of lubricant through said sealing system; and a packing gland located adjacent said bearing on the side of said bearing opposite said seal and said grease filled chamber.

2. An improved sealing system as in claim 1, wherein said seal is a radial lip seal.

3. An improved sealing system as in claim 2, wherein said radial lip seal includes a teflon contact lip for contacting the shaft.

4. An improved sealing system as in claim 1, wherein said input shaft is surrounded by an adapter attached to said housing, and further including a bead of silicon rubber around the interface between said bearing and said adapter to prevent leakage.

5. An improved sealing system as in claim 1, wherein said housing opening includes a portion that extends into said opening between said seal and the interior of said housing to block direct splash of lubricant from contacting the lip seal while allowing lubricant to continually flush the area between said seal and said portion.

6. An improved sealing system as in claim 1, wherein said packing gland is comprised of felt.

7. An improved sealing system for sealing an input shaft in a housing of a mechanical device with a shaft input opening, said shaft being supported in said reducer housing on at least one bearing assembly in said opening at said input side, said sealing system comprising:

a seal arranged in said shaft input opening for surrounding said input shaft, said seal being located between said at least one bearing assembly and the interior of said housing whereby said seal will be exposed to lubricant from the interior of said gear reducer housing but such lubricant will be prevented from leaking from said housing at said shaft opening; and wherein said shaft is supported in a second bearing assembly in said housing and wherein each said bearing assembly includes a leading edge portion that contacts said housing in their respective positions prior to other portions of the bearing assemblies contacting the housing, wherein said housing is dimensioned so that the leading edge of each said bearing assembly contacts the housing in their respective positions prior to the shaft contacting the lip seal so as to assist in alignment of the shaft with respect to the seal during assembly.

8. An improved sealing system as set forth in claim 7, wherein said shaft includes a raised annular portion defining a contact surface for said seal, said raised annular portion having an axial width less than an axial width of each of said bearing assemblies.

9. An improved sealing system for a housing containing gears operating in a lubricated environment, said housing having an opening through which a shaft supported in a bearing assembly extends for mating with at least one of said gears in said housing, said sealing system comprising:

a seal arranged in said opening through which said shaft extends, said seal being located between said bearing assembly and the interior of said housing whereby said seal will be exposed to lubricant from the interior of said housing but such lubricant will be prevented from leaking from said housing at said shaft input opening;

a grease filled chamber between said seal and said bearing, said grease filled chamber further preventing leakage of lubricant through said sealing system; and a packing gland located adjacent said bearing on the side of said bearing opposite said seal and said grease filled chamber.

10. An improved sealing system as set forth in claim 9, wherein said seal is a radial lip seal.

11. An improved sealing system as set forth in claim 10, wherein said radial lip seal includes a teflon contact lip for contacting the shaft.

12. An improved sealing system as set forth in claim 9, wherein said shaft is surrounded by an adapter attached to said housing, and further including a bead of silicon rubber around the interface between said bearing and said adapter to prevent leakage.

13. An improved sealing system as set forth in claim 9, wherein said housing opening includes a portion that extends into said opening between said seal and the interior of said housing to block direct splash of lubricant from contacting the lip seal.

14. An improved sealing system for a housing containing gears operating in a lubricated environment, said housing having an opening through which a shaft supported in a bearing assembly extends for mating with at least one of said gears in said housing, said sealing system comprising:

a seal arranged in said opening through which said shaft extends, said seal being located between said bearing assembly and the interior of said housing whereby said seal will be exposed to lubricant from the interior of said housing but such lubricant will be prevented from leaking from said housing at said shaft input opening; and wherein said shaft is supported in a second bearing assembly in said housing and wherein each said bearing assembly includes a leading edge portion that contacts said housing in their respective positions prior to other portions of the bearing assemblies contacting the housing, wherein said housing is dimensioned so that the leading edge of each said bearing assembly contacts the housing in their respective positions prior to the shaft contacting the lip seal so as to assist in alignment of the shaft with respect to the seal during assembly.

15. An improved sealing system as set forth in claim 14, wherein said shaft includes a raised annular portion defining a contact surface for said seal, said raised annular portion having an axial width less than an axial width of each of said bearing assemblies.

* * * * *